United States Patent
Ong et al.

(10) Patent No.: US 10,328,609 B2
(45) Date of Patent: Jun. 25, 2019

(54) DEVICE AND METHOD FOR MANUFACTURING IMPREGNATED FIBER BUNDLE

(71) Applicant: Ching-Long Ong, Taichung (TW)

(72) Inventors: Ching-Long Ong, Taichung (TW); Te-Wen Lu, Taichung (TW)

(73) Assignee: Ching-Long Ong, Taichung (TW)

( * ) Notice: Subject to any disclaimer, the term of this patent is extended or adjusted under 35 U.S.C. 154(b) by 376 days.

(21) Appl. No.: 15/078,740

(22) Filed: Mar. 23, 2016

(65) Prior Publication Data
US 2017/0274561 A1  Sep. 28, 2017

(51) Int. Cl.
| B29B 15/14 | (2006.01) |
|---|---|
| B29B 15/08 | (2006.01) |
| B29B 13/02 | (2006.01) |
| B29B 15/12 | (2006.01) |
| B29B 13/08 | (2006.01) |
| B29C 70/52 | (2006.01) |

(52) U.S. Cl.
CPC .............. *B29B 13/02* (2013.01); *B29B 13/08* (2013.01); *B29B 15/12* (2013.01); *B29B 15/122* (2013.01); *B29C 70/525* (2013.01); *B29C 70/528* (2013.01); *B29C 70/526* (2013.01)

(58) Field of Classification Search
CPC ......... B29B 15/08; B29B 15/12; B29B 13/08; B29B 15/14; B29B 15/122; B29B 15/00; B29C 70/52; B29C 70/525; B29C 70/526; B29C 70/527; B29C 70/528; B29C 70/521; B29C 70/523
See application file for complete search history.

(56) References Cited

U.S. PATENT DOCUMENTS

| 5,266,139 A * | 11/1993 | Yokota ................ B29C 53/8041 156/158 |
|---|---|---|
| 2013/0147082 A1* | 6/2013 | Johnson .................. B29C 41/30 264/136 |

\* cited by examiner

*Primary Examiner* — Philip C Tucker
*Assistant Examiner* — Jimmy R Smith, Jr.
(74) *Attorney, Agent, or Firm* — Wang Law Firm, Inc.

(57) ABSTRACT

A method for manufacturing impregnated fiber bundle includes: a step of feeding material including feeding at least one fiber bundle to a feeding wheel assembly; a step of resin molding including feeding resin to the fiber bundle in a high pressure manner to make the resin infiltrate the fiber bundle and to form an outer resin layer on the outer surface of the fiber bundle, so as to make the fiber bundle become a resin impregnated fiber bundle; a step of semi-cured molding including semi curing the resin inside and outside the resin impregnated fiber bundle by controlling temperature and pressure; and a step of reeling including reeling up the resin impregnated fiber bundle which is to be woven into a fabric.

7 Claims, 5 Drawing Sheets

DEVICE AND METHOD FOR MANUFACTURING IMPREGNATED FIBER BUNDLE

BACKGROUND OF THE INVENTION

Field of the Invention

The present invention relates to a fiber made fabric, and more particularly to a device and a method for manufacturing impregnated fiber bundle.

Related Prior Art

All fabrics are made of woven fibers, and fiber fabric has found wide application in all kinds of products from clothing to equipment outer shell or even material of construction. The quality of the fiber fabric made products is closely related to the properties of the fiber fabric. The fiber fabrics have been subjected to the process of gluing and bonding, so that once hardened, fiber fabric made products are less likely to become soft or saggy. Or, the fiber fabric made products can be made of lamination of multiple layers of fiber fabric, so as to enhance the thickness or structure strength of the fiber fabric made products. Multiple layers of fiber fabrics are laminated one on top of another, and then subjected to the process of impregnating and gluing, and glue filling. The existing fiber fabric products have the disadvantages of poor bonding, air between the gluing layers, or disconnection of the gluing layers.

For the reason why the fiber fabric made products have the abovementioned disadvantages, reference should be made to FIGS. 1 and 2, the conventional gluing method is to impregnate the fabric 2 which is made of a plurality of fiber bundles 1 with glue or adhesive solution, or put the fabric 2 into a mould, then fill the mould with glue. This conventional gluing method can only form a layer of glue on the surface of the fabric 2, however, the glue can't soak into the fiber bundles 1, or even the outer surfaces of the fiber bundles 1 are not fully coated with glue. Due to low soaking rate, the bonding force between the fibers of the fiber bundle 1 is very limited, which negatively affects the structural strength of the fabric 2. Glue is unable to penetrate to the contacting points A between the fiber bundles 1 or to the narrow space adjacent to the contacting points A. The higher the viscosity of the glue, the more difficult the glue to penetrate into the surface of the fiber bundles 1 or the contacting points A, which will result in low bonding force, rigidity and low elasticity of the fiber bundles 1 since there is no enough glue layers 3 after the fabric 2 is formed.

The present invention has arisen to mitigate and/or obviate the afore-described disadvantages.

SUMMARY

The present invention is aimed at providing a device and a method for manufacturing impregnated fiber bundle, wherein resin infiltrates into every fiber of the fiber bundle, and also forms an outer resin layer, so as to improve the bonding of the fiber bundles, consequently improving the structure strength, rigidity and flexibility of the fabric woven by the fiber bundles.

To achieve the above objective, a method for manufacturing impregnated fiber bundle in accordance with the present invention comprises the following steps:

a step of feeding material including feeding at least one fiber bundle to a feeding wheel assembly;

a step of resin molding including feeding resin to the fiber bundle in a high pressure manner to make the resin infiltrate the fiber bundle and to form an outer resin layer on the outer surface of the fiber bundle, so as to make the fiber bundle become a resin impregnated fiber bundle;

a step of semi-cured molding including semi curing the resin inside and outside the resin impregnated fiber bundle by controlling temperature and pressure; and a step of reeling including reeling up the resin impregnated fiber bundle which is to be woven into a fabric.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

DETAILED DESCRIPTION

The present invention will be clearer from the following description when viewed together with the accompanying drawings, which show, for purpose of illustrations only, the preferred embodiment in accordance with the present invention.

Figure 1:
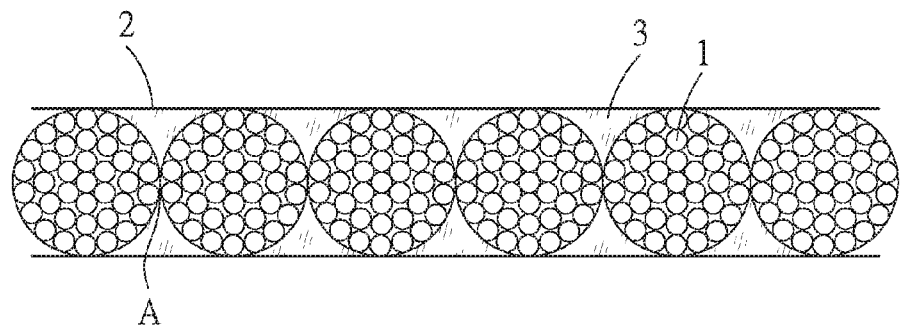
FIG. 1 is a cross sectional view of a conventional fiber fabric.
Figure 2:
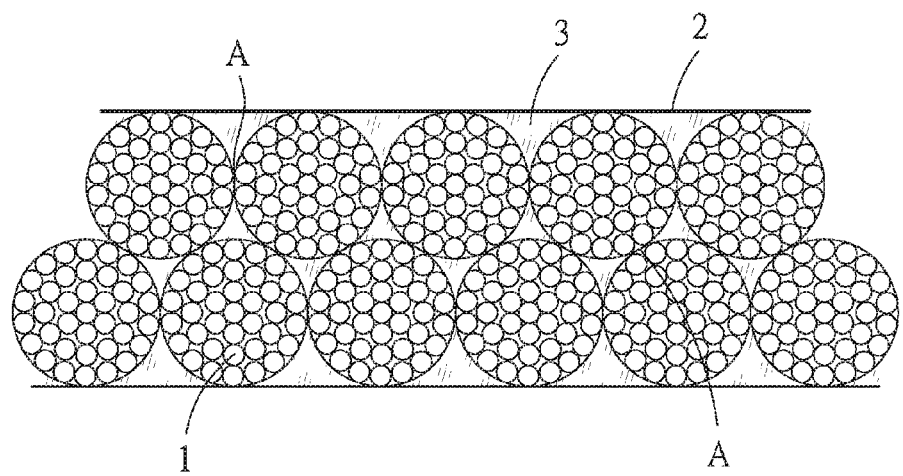
FIG. 2 is another cross sectional view of the conventional fiber fabric.
Figure 3:
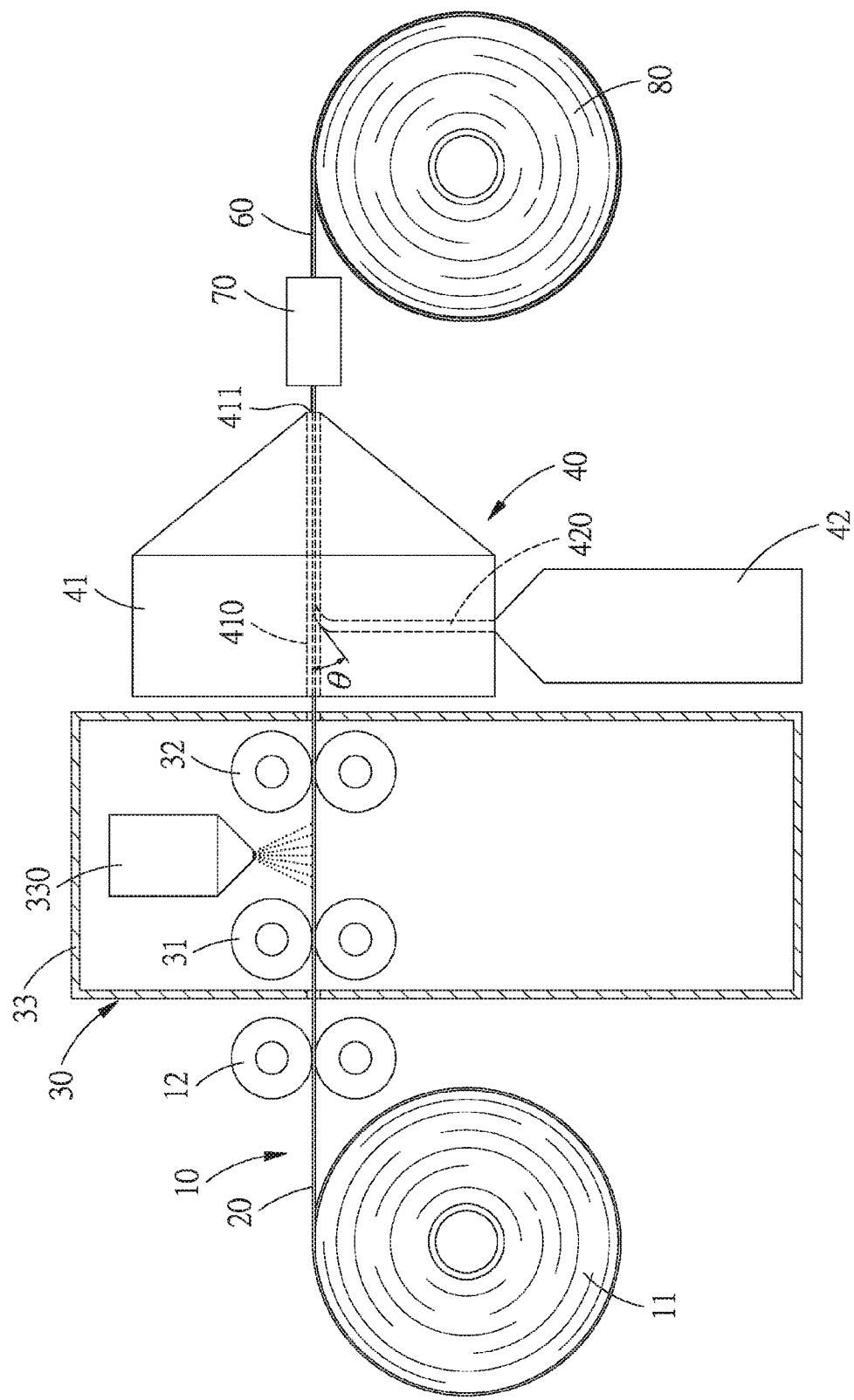
FIG. 3 is an illustrative view of the device for manufacturing impregnated fiber bundle in accordance with the preferred embodiment of the present invention.

Referring to FIG. 3, a device for manufacturing impregnated fiber bundle in accordance with the preferred embodiment of the present invention comprises: a feeding unit 10, a surface roughening unit 30, a resin molding unit 40, a semi-cured molding unit 70 and a reeling unit 80.

The feeding unit 10 includes a fiber bundle wheel 11 and a feeding wheel assembly 12. The fiber bundle wheel 11 supplies at least one fiber bundle 20 to the feeding wheel assembly 12.

Figure 4:
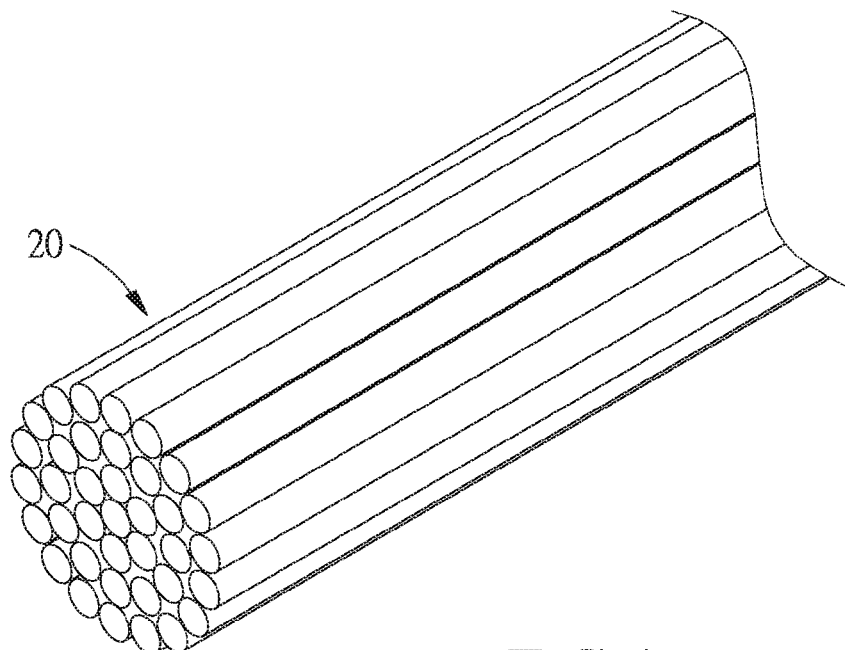
FIG. 4 is an illustrative view showing the method for manufacturing impregnated fiber bundle in accordance with the preferred embodiment of the present invention.

The surface roughening unit 30 is connected to the feeding unit 10, and includes a front twist wheel assembly 31, a rear twist wheel assembly 32, and a negative pressure chamber 33. The front and rear twist wheel assemblies 31, 32 twist the fiber bundle 20 into a desired shape, such as a wave like shape or a straight shape, as shown in FIG. 4.

The negative pressure chamber 33 is provided with a roughening mechanism 330 (which is an electric arc generator). When the fiber bundle 20 is fed into the negative pressure chamber 33 by the feeding wheel assembly 12, the roughening mechanism 330 will continuously produce discharge gas to form a plurality of cavities 21 in the surface of the fiber bundle 20, meanwhile, air will be drawn out of the negative pressure chamber 33 to create negative pressure in the negative pressure chamber 33, so as to absorb the dust generated by the roughening mechanism 330, and to create negative pressure inside the fiber bundle 20.

Figure 5:
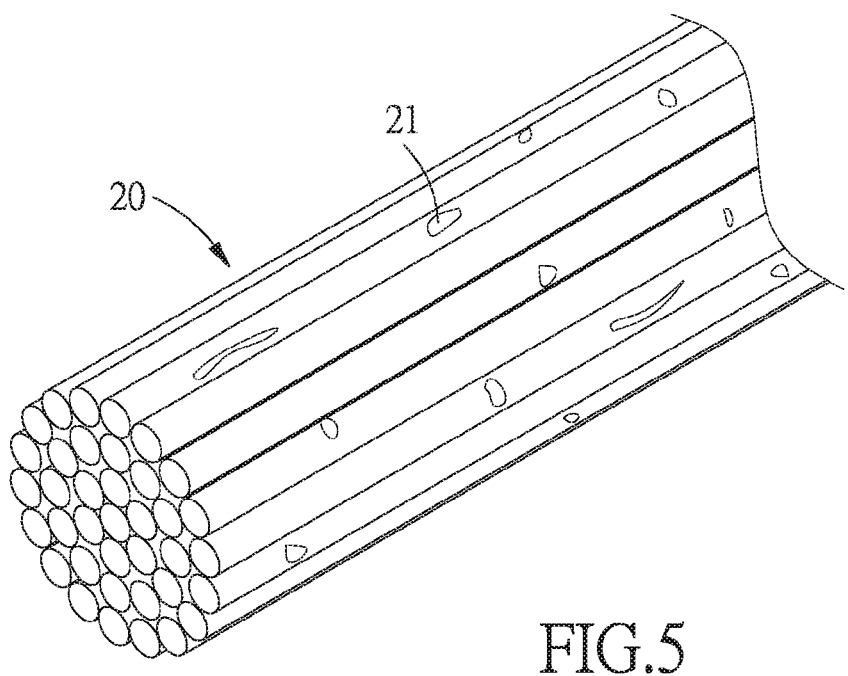
FIG. 5 is a second illustrative view showing the method for manufacturing impregnated fiber bundle in accordance with the preferred embodiment of the present invention.

Therefore, a plurality of cavities will be formed in the surface of the fiber bundle 20 after the fiber bundle 20 is roughened by the surface roughening unit 30, as shown in FIG. 5.

The resin molding unit 40 is connected to the surface roughening unit 30, and includes an output device 41 and a resin input device 42 (in the form of a continuous screw) which communicate with each other. The output device 41 includes an output pipeline 410 for transporting the fiber bundle 20 which has been formed with the cavities 21. The resin input device 42 includes an input pipeline 420 which communicates with the output pipeline 410. Resin is fed from the input pipeline 420 into the output pipeline 410 by the continuous screw in a high pressure manner, and infiltrates into the fiber bundle 20 to form an outer resin layer 50 on the outer surface of the fiber bundle 20. The resin soaking rate inside the fiber bundle 20 is increased, and the cavities 21 formed in the surface of the fiber bundle 20 increase the bonding force and bonding area between the fiber bundle 20 and the resin. The output device 41 includes an output hole 411 for outputting a resin impregnated fiber bundle 60.

It is to be noted that the input pipeline 420 is disposed at an input angle θ with respect to the output pipeline 410 (θ ranges from 32 to 64 degrees, and preferably from 32 to 60 degrees, and the input angle is no more than 65 degrees), so that the resin from the input pipeline 420 can be fully applied to the outer surface of the fiber bundle 20, and the problem that the fiber bundle 20 is likely to break if the pressure of the input pipeline 420 is too high can be prevented.

Figure 6:
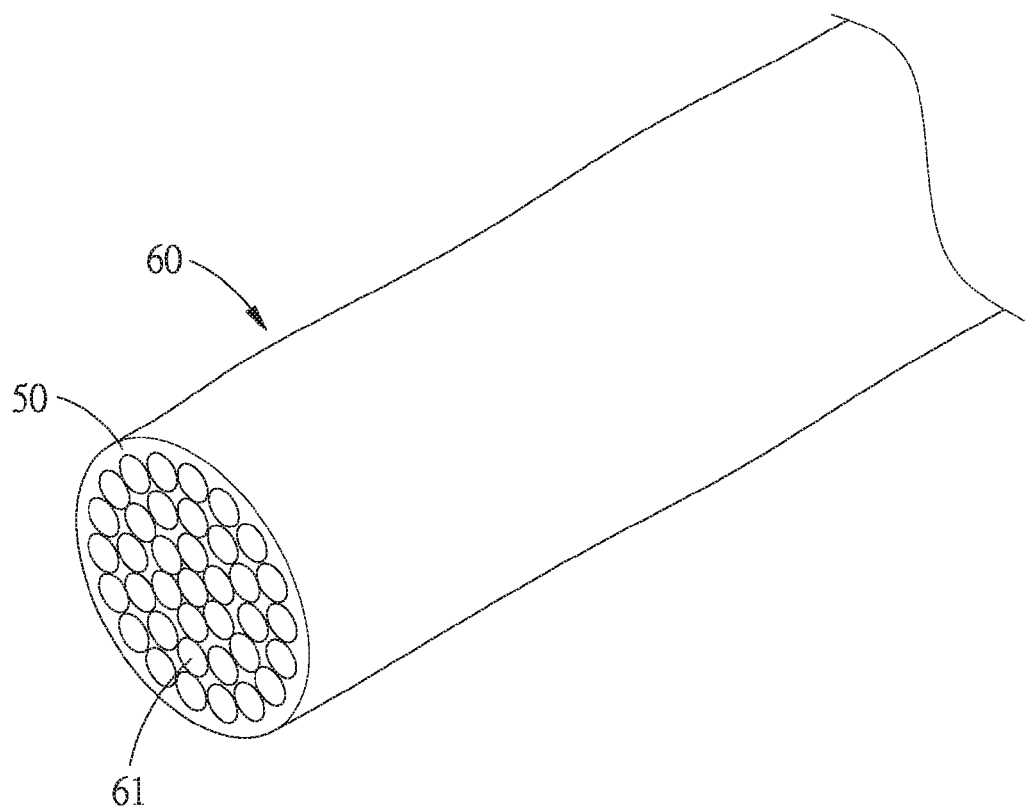
FIG. 6 is a third illustrative view showing the method for manufacturing impregnated fiber bundle in accordance with the preferred embodiment of the present invention.

The fiber bundle 20 will become the resin impregnated fiber bundle 60 after being treated by the resin molding unit 40, as shown in FIG. 6, so that each of the fiber bundles 61 of the resin impregnated fiber bundle 60 is impregnated with resin in a high soaking rate, and covered with the outer resin layer 50.

In this embodiment, the resin can be a viscose or a viscose fiber.

The semi-cured molding unit 70 is connected to the resin molding unit 40 to receive the resin impregnated fiber bundle 60 coming from the output device 41. The semi-cured molding unit 70 makes the resin inside and outside the fiber bundles 61 of the resin impregnated fiber bundle 60 semi-cured by controlling the temperature and pressure inside the semi-cured molding unit 70, so as to facilitate the follow-up weaving process (during which the fiber bundle 60 is woven into fabric 90).

The reeling unit 80 (a reeling wheel) is connected to the semi-cured molding unit 70 to reel the resin impregnated fiber bundle 60 in, and the resin impregnated fiber bundle 60 is to be woven into a fabric 90.

A method for manufacturing impregnated fiber bundle in accordance with the preferred embodiment of the presenting comprises the following steps:

a step of feeding material: feeding at least one fiber bundle 20 to a feeding wheel assembly 12;

a surface roughening step: roughening the surface of the fiber bundle 20 to form a plurality of cavities 21, and performing a twisting process during the surface roughening step, the twisting process including twisting parallel arranged fiber bundle 20 into a wave like shape or a straight shape by using a front twist wheel assembly 31 and a rear twist wheel assembly 32;

the surface roughening step is performed in a negative pressure chamber 33 where an electric arc generator is disposed to continuously produce discharge gas to form a plurality of cavities 21 in the surface of the fiber bundle 20, meanwhile, negative pressure is created in the negative pressure chamber 33 to absorb the dust generated by the roughening mechanism 330, and to create negative pressure inside the fiber bundle 20;

a step of resin molding: using a continuous screw to feed resin to the fiber bundle 20 in a high pressure manner to make the resin infiltrate the fiber bundle and form an outer resin layer on the outer surface of the fiber bundle 20, so as to make the fiber bundle 20 become a resin impregnated fiber bundle 60, the resin can be a viscose or a viscose fiber;

a step of semi-cured molding: semi curing the resin inside and outside the fiber bundles 61 of the resin impregnated fiber bundle 60 by controlling temperature and pressure, so as to facilitate the follow-up weaving process in which the resin impregnated fiber bundle 60 is woven into fabric; and a step of reeling: reeling up the resin impregnated fiber bundle 60 which is to be woven into a fabric 90.

Figure 7:
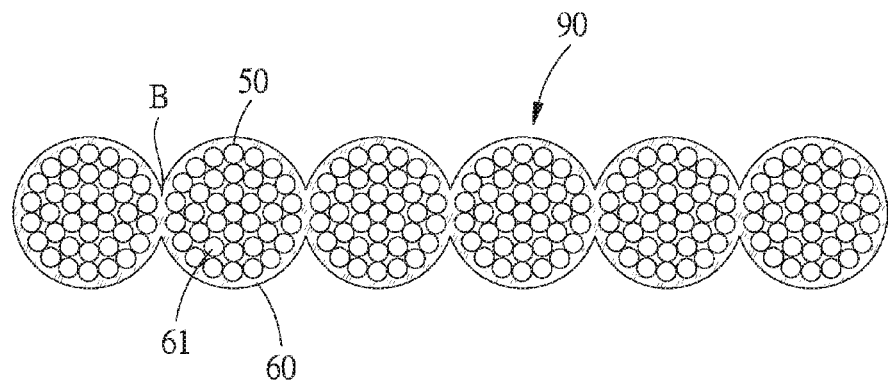
FIG. 7 is a fourth illustrative view showing the method for manufacturing impregnated fiber bundle in accordance with the preferred embodiment of the present invention.
Figure 8:
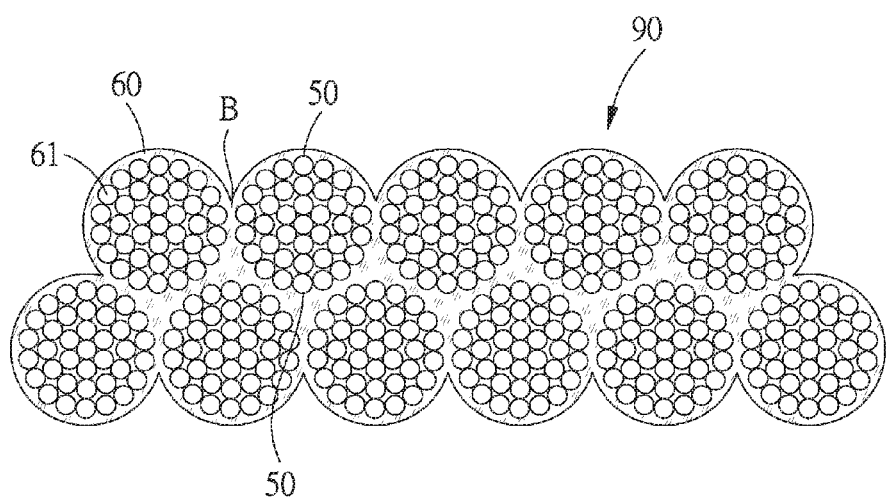
FIG. 8 is a fifth illustrative view showing the method for manufacturing resin impregnated fiber bundle in accordance with the preferred embodiment of the present invention.

Referring to FIGS. 7 and 8, when the resin impregnated fiber bundle 60 is woven into the fabric 90, the cured resin inside the fiber bundles 61 of the resin impregnated fiber bundle 60 can improve the structure strength of the fiber bundles 61. Besides, each of the fiber bundles 61 is also covered with resin or viscose fiber, resin or viscose fiber at the contact points B between the resin impregnated fiber bundles 60 can improve the structure strength, rigidity and flexibility of the fabric 90 which is woven by the resin impregnated fiber bundles 60.

While we have shown and described various embodiments in accordance with the present invention, it is clear to those skilled in the art that further embodiments may be made without departing from the scope of the present invention.

What is claimed is:

1. A device for manufacturing impregnated fiber bundle, comprising:

a feeding unit including a fiber bundle wheel and a feeding wheel assembly, the fiber bundle wheel supplying a fiber bundle to the feeding wheel assembly;

a surface roughening unit connected to the feeding unit, and including a negative pressure chamber, wherein the fiber bundle is fed into the negative pressure chamber by the feeding wheel assembly, an electric arc generator is disposed in the negative pressure chamber to continuously produce discharge gas to form a plurality of cavities in an outer surface of the fiber bundle, and wherein the negative pressure chamber creates negative pressure inside the fiber bundle;

a resin molding unit connected to the surface roughening unit, and including an output device and a resin input device which communicate with each other, the output device including an output pipeline for transporting the fiber bundle which has been formed with the cavities, the resin input device including an input pipeline which communicates with the output pipeline, wherein resin is fed from the input pipeline into the output pipeline by a continuous screw in a high pressure manner, and infiltrates into the fiber bundle to form an outer resin layer on the outer surface of the fiber bundle, the cavities increase bonding force and bonding area between the fiber bundle and the resin, the output device including an output hole for outputting a resin impregnated fiber bundle;

a semi-cured molding unit connected to the resin molding unit to receive the resin impregnated fiber bundle coming from the output device, the semi-cured molding unit enables the resin inside and outside the resin impregnated fiber bundle to be semi-cured by controlling temperature and pressure inside the semi-cured molding unit; and a reeling unit connected to the semi-cured molding unit to reel up the resin impregnated fiber bundle which is to be woven into a fabric.

2. The device for manufacturing impregnated fiber bundle as claimed in claim 1, wherein the surface roughening unit includes a front twist wheel assembly and a rear twist wheel assembly to twist the fiber bundle into a desired shape.

3. The device for manufacturing impregnated fiber bundle as claimed in claim 1, wherein negative pressure is created in the negative pressure chamber to absorb dust generated by the electric arc generator.

4. The device for manufacturing impregnated fiber bundle as claimed in claim 1, wherein the resin is a viscose or a viscose fiber.

5. The device for manufacturing impregnated fiber bundle as claimed in claim 1, wherein the resin input device includes the continuous screw.

6. The device for manufacturing impregnated fiber bundle as claimed in claim 1, wherein the input pipeline is disposed at an input angle with respect to the output pipeline, and the angle ranges from 32 to 64 degrees.

7. The device for manufacturing impregnated fiber bundle as claimed in claim 6, wherein the angle ranges from 32 to 60 degrees.

* * * * *